Patented Apr. 11, 1950

2,503,991

UNITED STATES PATENT OFFICE 2,503,991

METHOD OF PREPARING HETEROPOLY-ACIDS CONTAINING A HEAVY METAL

Max F. Bechtold, Kennett Square, Pa., assignor to E. I. du Pont de Nemours & Company, Wilmington, Del., a corporation of Delaware No Drawing. Application January 27, 1948, Serial No. 4,711

7 Claims. (Cl. 23—140)

This invention relates to heteropolyacids and more particularly to a new method for the preparation of heteropolyacids containing a heavy metal.

Heteropolyacids are known and have been prepared by heating a normal salt of the acid which supplies the central atom with an anhydride of the coordinated acid. For example, 12-tungstophosphate is produced when a boiling solution of an alkali phosphate is saturated with tungstic trioxide. Similarly, molybdo-vanadophosphates are prepared either by addition of phosphoric acid to a mixture of alkali vanadate and molybdate solutions or by warming molybdophosphates with vanadium pentoxide or with vanadates. These methods are all tedious and the yields of the desired acids are not as high as is desirable.

It is an object of this invention to provide a new method for the preparation of heteropolyacids containing a heavy metal. A further object is to provide a simple and practical method for the preparation of heteropolyacids containing silicon or phosphorus combined with heavy metal oxides. Another object is to provide a process for the preparation of heteropolyacids of widely varying compositions. Other objects will appear hereinafter.

These objects are accomplished by the following invention which comprises contacting a cation-exchange reagent with an aqueous solution of an alkali metal phosphate and an alkali metal salt of an oxide of a metal from group VI-A of the periodic table having an atomic number of 42 to 74 inclusive, and separating from the cation-exchange reagent an aqueous solution containing a heteropolyacid of phosphorus and of said metal from group VI-A of the periodic table. In the same manner when a cation-exchange reagent is contacted with an aqueous solution of an alkali metal silicate and an alkali metal molybdate, the aqueous solution separated from the cation-exchange reagent contains a heteropolyacid of silicon and molybdenum. It has been discovered that when an aqueous solution containing a mixture of an alkali metal phosphate with either an alkali metal molybdate or tungstate or containing a mixture of an alkali metal silicate with an alkali metal molybdate is contacted with a cation-exchange reagent there is obtained relatively clear, stable solutions containing phosphoric acid or silicic acid with the heavy metal oxides combined in the form of heteropolyacids.

The preferred alkali metal salts are the sodium and potassium salts because of their ready availability. However, any of the other alkali metal salts can be used in this process, that is the salts of lithium, rubidium and cesium.

The cation-exchange reagents used in the practice of this invention may be of organic or inorganic origin. The inorganic cationic reagents may be of natural or synthetic origin. Examples of natural inorganic cationic reagents are processed green sands and clays and of synthetic inorganic cationic reagents are the gel zeolites. Examples of organic cationic reagents are sulfonated coals, wood waste, petroleum sludge, etc., lignin sulfonic acid-phenol-aldehyde resins of the type described in U. S. Patent 2,259,455; phenol-formaldehyde resins containing omega-sulfonic acid groups and etherified phenolic hydroxyl groups of the type described in U. S. Patent 2,259,503; tannin-formaldehyde resins of the type described in U. S. Patent 2,094,359; polyhydric phenol-tannin-formaldehyde resins of the type described in U. S. Patent 2,104,501; phenol-aldehydesulfonic acid resins of the type described in U. S. Patent 2,319,359; amino, hydroxy, and aminohydroxynaphthalene sulfonic acid-phenol-formaldehyde resins of the type described in U. S. Patent 2,333,754; and sulfonated phenol-formaldehyde resins of the type described in U. S. Patent 2,191,853 and British Patent 588,380, and the like. Of these cationic-exchange reagents, the preferred reagents, because of their effectiveness and ready availability, are the sulfonated phenol-formaldehyde type resins and the sulfonated polystyrene resins of the type described in U. S. Patent 2,366,007.

In one embodiment of the process of this invention, a dilute aqueous solution of a mixture of an alkali metal silicate with an alkali metal molybdate is prepared containing not more than 10% by weight of total solids calculated as the mixed oxides and this dilute aqueous solution is brought into contact with the cation-exchange reagent. In other embodiments of this invention, a mixture of an alkali metal phosphate with an alkali metal molybdate or tungstate containing not more than 10% by weight of total solids, calculated as the mixed oxides, is brought into contact with the cation-exchange reagent. Best results are obtained with solutions containing from 1 to 6% by weight of total solids, calculated as the mixed oxides. Ordinarily it is uneconomical to operate with solutions containing less than about 0.1% by weight of total solids, calculated as the mixed oxides.

The cation-exchange reagent may be confined in a column through which the solution to be treated is caused to flow, as by gravity or pumping. In another embodiment of this invention the cation-exchange reagent, preferably in granular form, may be dispersed in the solution as by agitation and may then be filtered off or settled out after the desired ion exchange has occurred. In practice it has been found that the use of columns packed with the ion-exchange reagent is the preferred manner of operation.

In accordance with the process described herein, there are obtained solutions of heteropolynuclear acids containing silicon or phosphorus as the coordinating atom. Heteropolynuclear acids can thus be obtained containing $SiO_2/MoO_3$, $P_2O_5/WO_3$ or $P_2O_5/MoO_3$ in the ratio of one coordinating atom (Si or P) up to 12 or more atoms of tungsten or molybdenum. The heteropolynuclear acids formed by the process of this invention may be recovered by evaporation of the water.

The solutions used in the examples are made at room temperature, about 22° C., and the measurements given are of determinations made also at room temperature, unless otherwise specified. The following examples are submitted to illustrate the best modes of practicing this invention and not as limitations thereof.

Example I

A solution (250 g.) of $Na_2MoO_4.2H_2O$ (0.10 mole/kg.) is mixed with 750 g. of aqueous sodium silicate (0.333 mole $SiO_2$/kg., 0.092 mole $Na_2O$/kg.). The resultant clear solution, in which the mole ratio of $SiO_2/MoO_3$ is 10/1, is passed down through a vertical Pyrex glass tube (I. D.=2.2 cm.) containing 140 g. of a moist solid granular commercial synthetic cation-exchange resin, prepared by condensation of o, m, and p-phenolsulfonic acids with formaldehyde, the elemental analysis of which is: C=34.32%, H=6.08%, S=6.24%, N=0.54%, O=53.82% (by difference). The resin, the bulk of which lies between 14 and 35 mesh in size, is packed in the column to a height of about 60 cm. and is brought to a clean, acidic condition before use by up-washing with 2 liters of $H_2O$. After regeneration by passage down of excess 2% $H_2SO_4$ (1 kg.), followed by up-washing with 2 liters of $H_2O$, it is covered with water, which is finally displaced by the influent solution to be exchanged. The effluent, collected at a steady rate within 35 minutes contains 1.01% $SiO_2$, 0.31% $MoO_3$, 0.045% $Na_2O$, has a pH of approximately 4.85, is yellow-green in color, and yields a silico-molybdenum blue color when contacted with sodium bisulfite.

Example II

A mixture of the sodium molybdate and sodium silicate solutions of Example I in the proportions of 600 g. to 15 g. containing a mole ratio of $SiO_2/MoO_3$ of 1/12 is passed through a similarly prepared cation-exchange column. The yellow-green effluent contains 0.91% $MoO_3$, 0.036% $SiO_2$, 0.029% $Na_2O$, (all by weight) and has a pH of 1.83. Evaporation of the effluent yields yellow crystals which are substantially soluble in water, have an X-ray powder diffraction pattern typical of a complex crystal structure with a line corresponding to a long spacing (in this case 12 Å.) characteristic of heteropolynuclear acids. In contrast, a similarly cation-exchanged effluent from the unmodified sodium molybdate solution, is blue in color, and upon evaporation, in the presence of an oxidizing agent ($HNO_3$), yields a white insoluble powder, which starts to precipitate from the boiling solution at an $MoO_3$ concentration of approximately 2% by weight. The X-ray diffraction pattern of this molybdic acid is different from that of the above described heteropolynuclear acid and is characteristic of a simple crystal structure.

Example III

A solution (77 g.) of $Na_2HPO_4.12H_2O$ (0.1 mole/kg.) is mixed with 923 g. of $Na_2WO_4.2H_2O$ solution (0.1 mole/kg.) and the mixture, containing $24WO_3/1P_2O_5$, is subjected to cation exchange as in Example I. The effluent collected at a uniform rate within 50 minutes has a pH of 2.0, and upon evaporation yields white to cream colored crystals (93.0% $WO_3$, 2.8% $PO_4$, 1.21% $Na_2O$), which are substantially completely soluble in water and show a complex crystal structure by X-ray diffraction. In contrast, cation exchange in an unmodified $Na_2WO_4.2H_2O$ solution (12/130 mole/kg.) results in an effluent (pH 1.8) yielding a white insoluble powder upon evaporation. The X-ray diffraction pattern of this tungstic acid is different from that of the heteropolynuclear phosphotungstic acid described above.

Example IV

The sodium molybdate solution (923 g.) of Example I is mixed with 77 g. of $Na_2HPO_4.12H_2O$ solution of Example III and is subjected to cation exchange as in Example I. The green effluent collected at a uniform rate within 55 minutes has a pH of 1.7. When evaporated in the presence of chlorine at room temperature, waxy yellow-green crystals of partial or complete sodium salt of a phospho-molybdic acid (85.45% $MoO_3$, 5.77% $PO_4$, 4.04% $Na_2O$) are obtained which have 1 triangular face and show an X-ray diffraction pattern substantially identical with that of silico-molybdic acid of Example II.

Example V

A water solution (1 kg.) containing 0.0923 mole $Na_2MoO_4.2H_2O$ and 23 g. of sodium silicate (equivalent to 0.0105 mole $SiO_2$+0.0031 mole $Na_2O$) is subjected to cation exchange as in Example I. The effluent collected at a uniform rate within 1 hour has a pH of 1.73 to 1.79 and and contains 1.05% $MoO_3$, 0.055% $SiO_2$ and 0.018% $Na_2O$ by weight. Upon evaporation in the presence of 5 drops of 3% $H_2O_2$ (USP), about 12.5 g. of yellow crystals are obtained which have the X-ray diffraction pattern of a complex crystal structure and show long spacings (in this case 9.9, 11 Å.) characteristic of heteropolynuclear acids and salts thereof.

As previously indicated, the preferred conditions involve the use of dilute solutions containing from 1 to 6% by weight of total solids, calculated as the mixed oxides. With the use of solutions in this range of concentration, less inactivation occurs through deposition of oxides on the cation-exchange reagent. Efficiency, from the standpoint of the amount of solids processed per unit volume of solution, increases rapidly with increasing solids content of the influent. However, this is counterbalanced by an increasing tendency to accumulate oxides in the exchange column which increases the difficulty in regenerating the column and decreases the purity of the product.

In carrying out the process of this invention a solution is prepared containing the alkali metal silicate and alkali metal molybdate or the alkali metal phosphate and either the alkali metal tungstate or alkali metal molybdate. To do this, the alkali metal silicate and alkali metal molybdate or the alkali metal phosphate and alkali metal tungstate or molybdate may be separately dissolved and the solutions mixed or they may be premixed and the mixture dissolved to make a common solution. The former practice is preferred. In the preparation of these solutions any ratio of alkali metal silicate to alkali metal molybdate or of alkali metal phosphate to alkali metal molybdate or alkali metal tungstate may be used. As a rule, however, the solutions contain an amount of alkali metal silicate and alkali metal molybdate or alkali metal phosphate and either alkali metal molybdate or tungstate such that the mole ratio of Si or P, calculated as the oxide, to molybdenum or tungsten, also calculated as the oxide, is in the range of 25:1 to 1:25 and preferably from 10:1 to 1:12. Mole ratios of 1:12 are particularly preferred as for example $1SiO_2:12MoO_3$.

The solution to be treated is subjected to contact with an ion-exchange reagent which in the present invention is a material capable of combining with cations, until the concentration of undesired ions is reduced to the desired degree without undue inactivation of the reagent. The solution is then drawn off as product and may be concentrated, if desired. To the extent that the ion-exchange reagent takes up cations it, of course, becomes ineffective for further reaction. Ion exchange processes are necessarily cyclic operations as ultimately the ion-exchange reagent must be renewed or regenerated. This may be done after the product solution has been drawn off, by washing the reagent, treating with an acid solution such as sulfuric acid solution, and then washing out excess acid.

The process of this invention is an advance over prior methods for preparing heteropolynuclear acids because it permits a greater latitude in composition and because of simplicity in operation and in equipment requirements. It accomplishes the separation of by-product salts from the desired heteropolynuclear acid during the synthesis step itself by virtue of the fact that unwanted cations, such as sodium, are retained on the exchange resin.

The heteropolynuclear acids prepared in accordance with this invention are useful as catalysts, especially as catalysts for the hydration of olefins and also for dehydration reactions, such as the dehydration of alcohols to ethers and to olefins.

As many apparently widely different embodiments of this invention may be made without departing from the spirit and scope thereof, it is to be understood that this invention is not limited to the specific embodiments thereof except as defined in the appended claims.

I claim:

1. A method for preparation of a heteropolyacid which comprises preparing an aqueous solution containing dissolved therein two alkali metal compounds of which one is selected from the group consisting of an alkali metal silicate and an alkali metal phosphate, the second of said compounds being an alkali metal molybdate when the first of said compounds is an alkali metal silicate, and the second of said compounds being selected from the group consisting of an alkali metal molybdate and an alkali metal tungstate when the first of said compounds is an alkali metal phosphate, contacting an active cation-exchange reagent with said aqueous solution containing said two alkali metal compounds dissolved therein, and separating from said cation-exchange reagent an aqueous solution containing a heteropolyacid from the group consisting of silico-molybdic acid, phospho-tungstic acid, and phospho-molybdic acid.

2. A method for the preparation of a heteropolyacid of silicon and molybdenum which comprises preparing an aqueous solution containing dissolved therein an alkali metal silicate and an alkali metal molybdate, contacting an active cation-exchange reagent with said aqueous solution containing said silicate and molybdate dissolved therein, and separating from said cation-exchange reagent an aqueous solution containing a heteropolyacid of silicon and molybdenum.

3. A method for the preparation of a heteropolyacid of phosphorus and molybdenum which comprises preparing an aqueous solution containing dissolved therein an alkali metal phosphate and an alkali metal molybdate, contacting an active cation-exchange reagent with said aqueous solution containing said phosphate and molybdate dissolved therein, and separating from said cation-exchange reagent an aqueous solution containing a heteropolyacid of phophorus and molybdenum.

4. A method for the preparation of a heteropolyacid of phosphorus and tungsten which comprises preparing an aqueous solution containing dissolved therein an alkali metal phosphate and an alkali metal tungstate, contacting an active cation-exchange reagent with said aqueous solution containing said phosphate and tungstate dissolved therein, and separating from said cation-exchange reagent an aqueous solution containing a heteropolyacid of phosphorus and tungsten.

5. A method for the preparation of a heteropolyacid of silicon and molybdenum which comprises preparing an aqueous solution containing dissolved therein from 1 to 6% by weight of total solids, calculated as the mixed oxides, consisting of a sodium silicate and a sodium molybdate in the mole ratio of silicon to molybdenum of 25:1 to 1:25, contacting an acid activated cation-exchange reagent with said aqueous solution containing said silicate and molybdate dissolved therein, and separating from said cation-exchange reagent an aqueous solution containing a heteropolyacid of silicon and molybdenum.

6. A method for the preparation of a heteropolyacid of phosphorus and molybdenum which comprises preparing an aqueous solution containing dissolved therein from 1 to 6% by weight of total solids, calculated as the mixed oxides, consisting of a sodium phosphate and a sodium molybdate in the mole ratio of phosphorus to molybdenum, of 25:1 to 1:25, contacting an acid activated cation-exchange reagent with said aqueous solution containing said phosphate and molybdate dissolved therein, and separating from said cation-exchange reagent an aqueous solution containing a heteropolyacid of phosphorus and molybdenum.

7. A method for the preparation of a heteropolyacid of phosphorus and tungsten which comprises preparing an aqueous solution containing dissolved therein from 1 to 6% by weight of total solids, calculated as the mixed oxides, consisting of a sodium phosphate and a sodium tungstate in the mole ratio of phosphorus to tungsten of 25:1 to 1:25, contacting an acid activated cation-exchange reagent with said aqueous solution containing said phosphate and tungstate dissolved therein, and separating from said cation-exchange reagent an aqueous solution containing a heteropolyacid of phosphorus and tungsten.

MAX F. BECHTOLD.

REFERENCES CITED

The following references are of record in the file of this patent:

UNITED STATES PATENTS

| Number | Name | Date |
|---|---|---|
| 2,244,325 | Bird | June 3, 1941 |

OTHER REFERENCES

Mellor, Comprehensive Treatise on Inorganic and Theoretical Chemistry, vol. II (1925) pages 659–611, 863, vol. 6, pages 868, 872 (1931), published by Longmans, Green & Co., London.